United States Patent [19]
Ohtsuka

[11] Patent Number: 6,008,901
[45] Date of Patent: Dec. 28, 1999

[54] SHAPE MEASURING HETERODYNE INTERFEROMETER WITH MULTIPLEXED PHOTODETECTOR AARAY OR INCLINED PROBE HEAD

[75] Inventor: Masaru Ohtsuka, Machida, Japan

[73] Assignee: Canon Kabushiki Kaisha, Tokyo, Japan

[21] Appl. No.: 09/132,772

[22] Filed: Aug. 12, 1998

[30] Foreign Application Priority Data

Aug. 22, 1997 [JP] Japan .................................... 9-242211
Oct. 31, 1997 [JP] Japan .................................... 9-316338

[51] Int. Cl.⁶ .................................................. G01B 9/02
[52] U.S. Cl. ........................................ 356/349; 356/360
[58] Field of Search .................................. 356/349, 351, 356/359, 360, 357, 376; 250/559.22

[56] References Cited

U.S. PATENT DOCUMENTS

| | | | |
|---|---|---|---|
| 4,611,916 | 9/1986 | Yoshizumi | 356/349 |
| 4,776,699 | 10/1988 | Yoshizumi | 356/349 |
| 4,886,362 | 12/1989 | Oono | 356/349 |
| 5,485,275 | 1/1996 | Ohtsuka | 356/360 |

FOREIGN PATENT DOCUMENTS 2-11084  3/1990  Japan .

OTHER PUBLICATIONS

Yoshizumi, K. et al., "Precise Measuring System For Aspheric Surfaces," *Optics*, vol. 12, No. 6, pp 450–454 (Dec. 1983).

Primary Examiner—Samuel A. Turner
Attorney, Agent, or Firm—Fitzpatrick, Cella, Harper & Scinto

[57] ABSTRACT

A shape measuring apparatus of this invention includes a light source for generating light beams including two different frequency components, a first optical system for extracting a reference signal from the light beams including the two frequency components, a second optical system for reflecting one of the light beams including the two frequency components by a reference surface, reflecting the other light beam by a measuring region of a surface to be measured, and causing the two reflected light beams to interfere with each other, a photodetector having a plurality of photodetecting elements to detect the interference light beam from the optical system, a housing for holding at least a part of the optical system and the photodetector, an actuator for changing a relative position of the housing and the surface to be measured, and a length measuring device for detecting position information of the housing. An element corresponding to a light beam vertically reflected by the surface to be measured is selected from the photodetector. A measured signal is detected by adding output signals from the selected element and neighboring elements thereof. A distance between the housing and the surface to be measured is controlled in an optical axis direction such that a phase difference between the reference signal and the measured signal is held constant. A shape of the surface to be measured is measured from position information of the housing when the relative position of the housing and the surface to be measured is changed in a direction perpendicular to the optical axis.

18 Claims, 14 Drawing Sheets

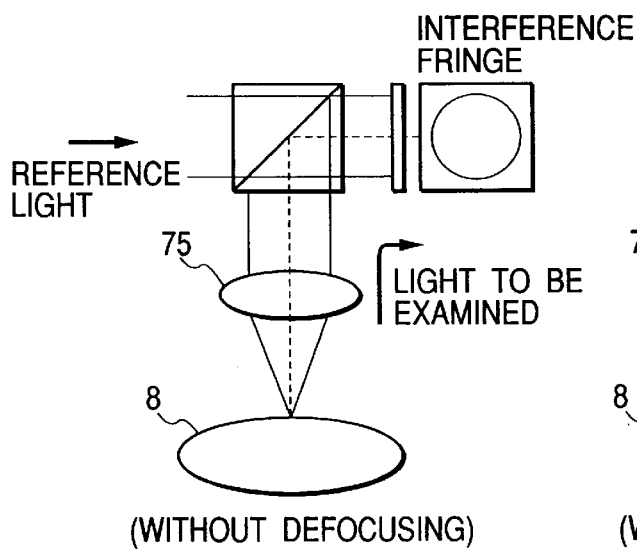
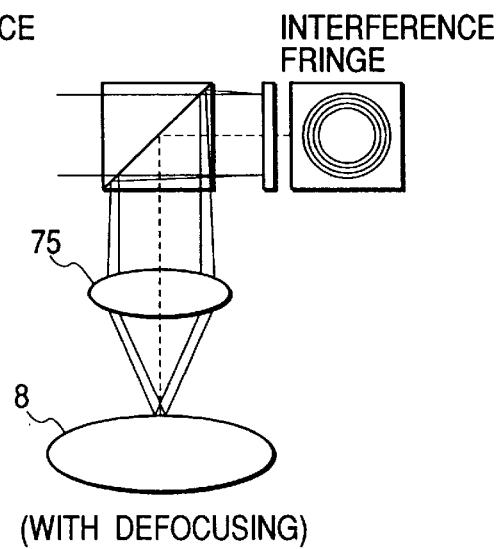
FIG. 3A (WITHOUT DEFOCUSING)
FIG. 3B (WITH DEFOCUSING)

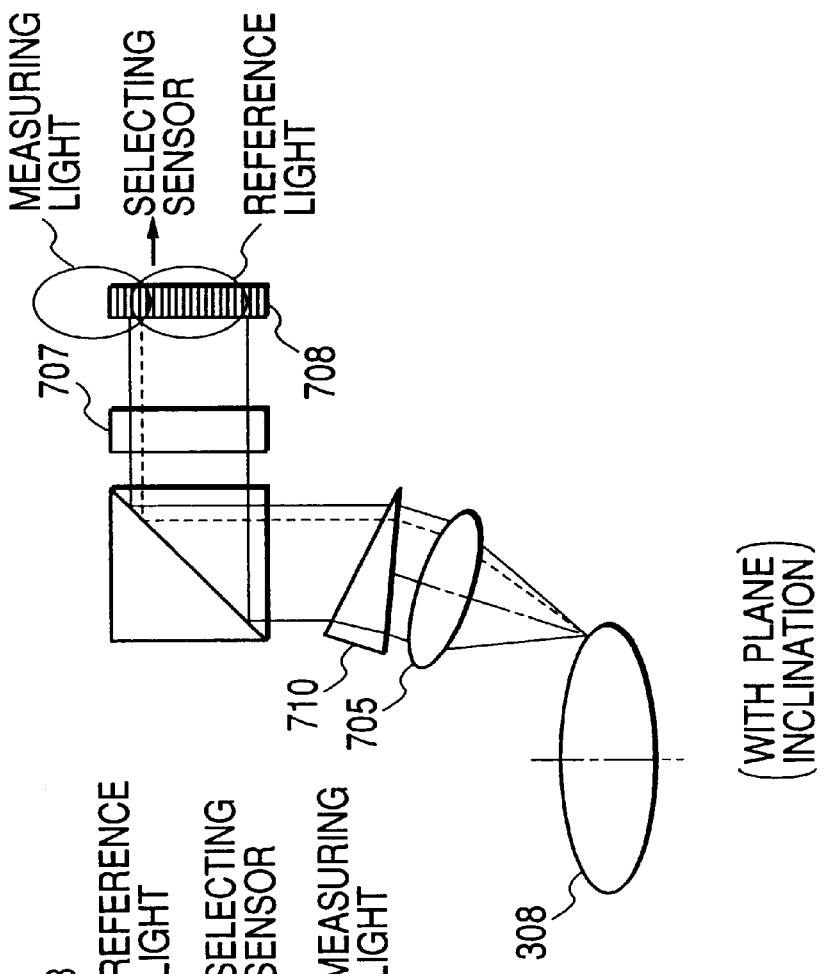
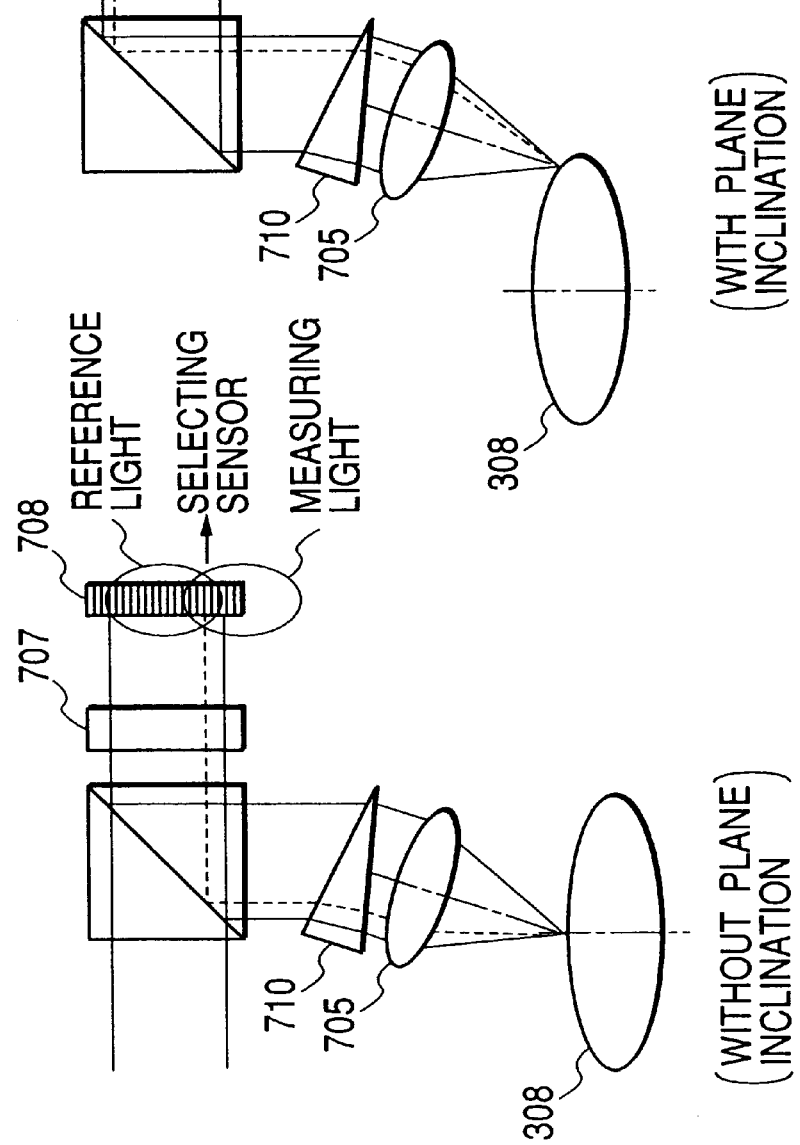

SHAPE MEASURING HETERODYNE INTERFEROMETER WITH MULTIPLEXED PHOTODETECTOR AARAY OR INCLINED PROBE HEAD

BACKGROUND OF THE INVENTION

1. Field of the Invention

The present invention relates to a shape measuring apparatus and a shape measuring method and, more particularly, to a shape measuring apparatus and a shape measuring method suited to accurately measure an aspherical shape, which is difficult to measure by a general interferometer, among other shapes of smoothly continuous objects such as lenses having comparatively large diameters, mirrors, and metal molds used in the fabrication of semiconductor devices.

2. Related Background Art

Conventionally, many interference apparatuses using interference phenomena of light are used to measure object surface shapes such as an aspherical shape. FIG. 12 is a schematic view showing the main components of a surface shape measuring apparatus disclosed in "Optics", Vol. 12, No. 6 (December 1983), pp. 450–454.

Referring to FIG. 12, this apparatus includes a Zeeman laser 901 as a light source, a beam splitter 902, polarization beam splitters 903 and 904, λ/4 plates 905a and 905b, an objective lens 906, a reference surface 907, a work (object to be measured) 908, a work stage 909, a focus detector 910, and beat signal detectors 911a and 911b.

In FIG. 12, two light components f1 and f2 emitted from the Zeeman laser 901 as a light source, polarized in directions perpendicular to each other, and having slightly different frequencies f1 and f2 are split into two parts by the beam splitter 902. Light components passing through the beam splitter 902 are spatially separated by the first polarization beam splitter 903.

Of these light components, the light component f1 travels straight, passes through the second polarization beam splitter 904, and is converted into circularly polarized light by the λ/4 plate 905a. This light so strikes as to be focused on the surface of the object (work) 908 by the objective lens 906. The light is returned to the objective lens 906 by so-called cat's eye reflection and converted into linearly polarized light by passing again through the λ/4 plate 905a. This linearly polarized light enters the second polarization beam splitter 904 such that the polarizing direction of the light is rotated 90° from that of the linearly polarized light before the reflection.

A special coating is formed on this polarization beam splitter 904. Accordingly, the polarization beam splitter 904 splits the returned light into two parts, transmits one part to the first polarization beam splitter 903, and reflects the other to the focus detector 910.

By using a signal from the focus detector 910, the objective lens 906 is moved by servo control in an optical axis direction indicated by the arrows such that the light is always focused on the surface of the work even if the work moves in a direction perpendicular to the optical axis.

On the other hand, the light component f2 reflected by the polarization beam splitter 903 is converted into circularly polarized light by the λ/4 plate 905b. This circularly polarized light is reflected by the reference surface 907 arranged on the work stage through the lens and the mirrors and returned to the polarization beam splitter 903. Since the light passes again through the λ/4 plate 905b, this light is converted into linearly polarized light whose polarizing direction is rotated 90°. Therefore, the light propagates to the beat signal detector 911b through the polarization beam splitter 903.

The light reflected by the work 908 and returned to the polarization beam splitter 903 also propagates to the beat signal detector 911b. Therefore, this light interferes with the light reflected by the reference surface 907, and the beat signal detector 911b detects a measured beat signal (F1–F2).

The light components f1 and f2 immediately after being emitted from the light source 901 are reflected by the beam splitter 902 and caused to interfere with each other to obtain a reference beat signal by the beat signal detector 911a. The phase difference between the measured beat signal obtained by the beat signal detector 911b and the reference beat signal obtained by the beat signal detector 911a is measured. This phase difference is integrated by a phase difference when the work 908 is scanned in the direction perpendicular to the optical axis. In this manner, the surface shape of the work 908 is measured.

The surface shape measuring apparatus shown in FIG. 12 obtains wave surface information of reflected light of light focused on the surface of the object 908. In this method, if a small dust particle or flaw is present on the object 908, the reflected light is scattered. This extremely changes the amount and phase of light returning to the detector 911b and makes the measurement difficult to perform. Consequently, an integrating counter error occurs to interrupt the measurement at that point.

Another conventional shape measuring apparatus is shown in FIGS. 13 and 14. FIG. 13 is a schematic view showing the major parts of a three-dimensional shape measuring apparatus proposed in Japanese Patent Publication No. 2-11084. FIG. 14 is a view for explaining a part of FIG. 13.

Referring to FIG. 13, two light components f1 and f2 emitted from a Zeeman laser 601 as a light source, polarized in directions perpendicular to each other, and having slightly different frequencies are partially guided to a photodetector 604 by a beam splitter 603. The photodetector 604 detects a reference beat signal. The light components passing through the beam splitter 603 enter a first polarization beam splitter 605. Of these light components, the light component f2 is reflected upward, condensed by a lens, and reflected by a fixed mirror 607 to reach a photodetector 608 through a lens and the polarization beam splitter 605.

The other light component f1 travels straight through the polarization beam splitter 605, passes through an objective lens 613 through a half mirror HM, and reaches the surface of a work (object to be measured) 609. The light is reflected by the surface and returned to the first polarization beam splitter 605 through the forward optical path. The light is then reflected by the first polarization beam splitter 605 to reach a photodetector 608 and interfere with the light f2. Consequently, a measured beat signal is detected.

By integrating a frequency difference δf between the reference beat signal obtained by the photodetector 604 and the measured beat signal obtained by the photodetector 608, an optical path length change of the light components f1 and f2 is measured. That is, a displacement (shape) in the optical axis direction of the work (object) 609 is measured.

In the surface shape measurement shown in FIG. 13, the measured beat signal cannot be detected unless light is always focused on the surface of the work 609. In this apparatus, therefore, a part of the reflected light from the work 609 is guided to photodetectors 611 and 612 via the half mirror HM. The positions of the objective lens 613 in an optical axis direction (Z) and a direction (X) perpendicular to the optical axis are servo-controlled such that light is always incident in the normal direction of the work 609 and kept focused on the surface of the work 609.

In this state, the work 609 is rotated (θ) about its axis of rotational symmetry by a driving means 623 and at the same time moved in a radial (X) direction. In this manner, a position where the light is incident is scanned in a cylindrical coordinate system (X-θ-Z system) to measure the entire surface shape of the work 609.

Additionally, as shown in FIG. 14, a work rotation axis 624 is inclined by an angle β in the X and Y planes to measure the work by using the full-aperture angle of the objective lens 613. This enables the measurement of a work having a large plane inclination.

In the measuring apparatus shown in FIG. 13, however, measurement errors of the surface shape of the work 609 are caused by, e.g., rotation errors of the work rotating stage and position read errors of the work radial direction moving stage. Accordingly, the measurement accuracy limit is dominated by the mechanical kinetic accuracy.

Furthermore, the embodiment by which a large inclination angle is measured by inclining the work rotation axis 624 to the radial direction movement axis has the following problems.

(A-1) Work support deformation is increased by oblique application of gravity.

(A-2) A large space in the apparatus is occupied by a work, and this increases the size of the apparatus.

(A-3) When a system for measuring and correcting the kinetic accuracy of the rotating stage is added, measurements based on external standards become difficult to perform because the rotating stage involves radial movement.

(A-4) It is difficult to automatically attach and detach a work.

SUMMARY OF THE INVENTION

The present invention has been made to solve at least one of the above conventional problems, and has as its object to provide a shape measuring apparatus capable of always measuring a surface shape with high accuracy because a beat signal to be measured is not interrupted even if a small dust particle or flaw is present on a surface to be measured.

It is another object of the present invention to provide an interference measuring apparatus capable of always appropriately obtaining an interference signal in accordance with an interference state.

It is still another object of the present invention to provide a shape measuring apparatus in which the surface of an object to be measured is optically scanned and measured in an R-θ-Z coordinate system by an optical probe from an optical head mounted on an R-θ-Z stage including three movable axes, i.e., a θ-rotating stage axis, an R-moving stage axis, and a Z-moving stage axis, and which can accurately obtain a three-dimensional shape of an object to be measured having a large inclined surface by attaching the optical probe such that its optical axis is inclined at a smaller angle than the half-aperture angle of its objective lens in an R-Z plane.

BRIEF DESCRIPTION OF THE DRAWINGS

FIGS. 3A and 3B are views for explaining an operation when defocusing is performed in the first embodiment;

FIGS. 10A and 10B are views for explaining an operation for plane inclination in the third embodiment;

DETAILED DESCRIPTION OF THE PREFERRED EMBODIMENTS

First Embodiment

Figure 1:
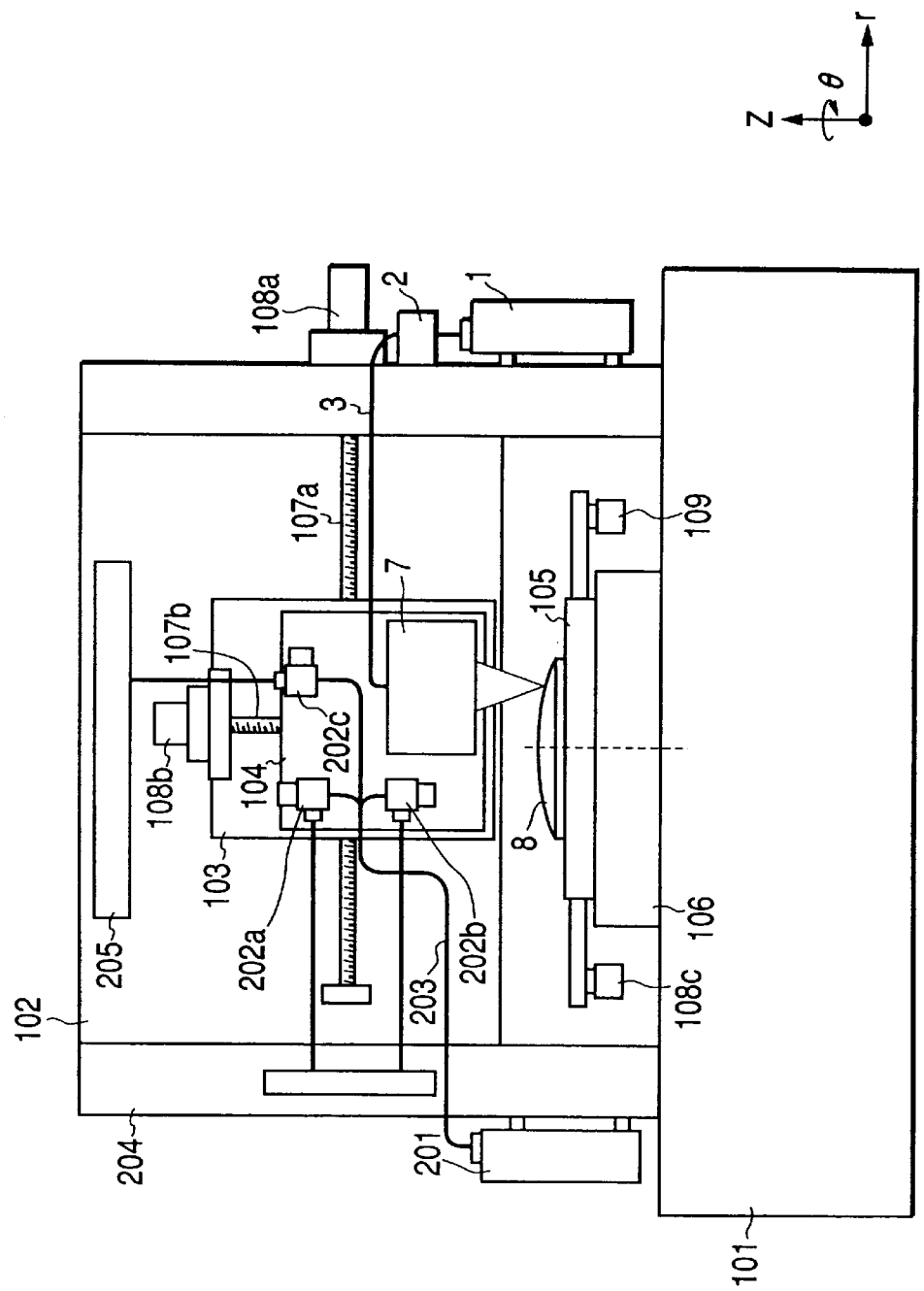
FIG. 1 is a front view showing the overall arrangement of the first embodiment.
Figure 2:
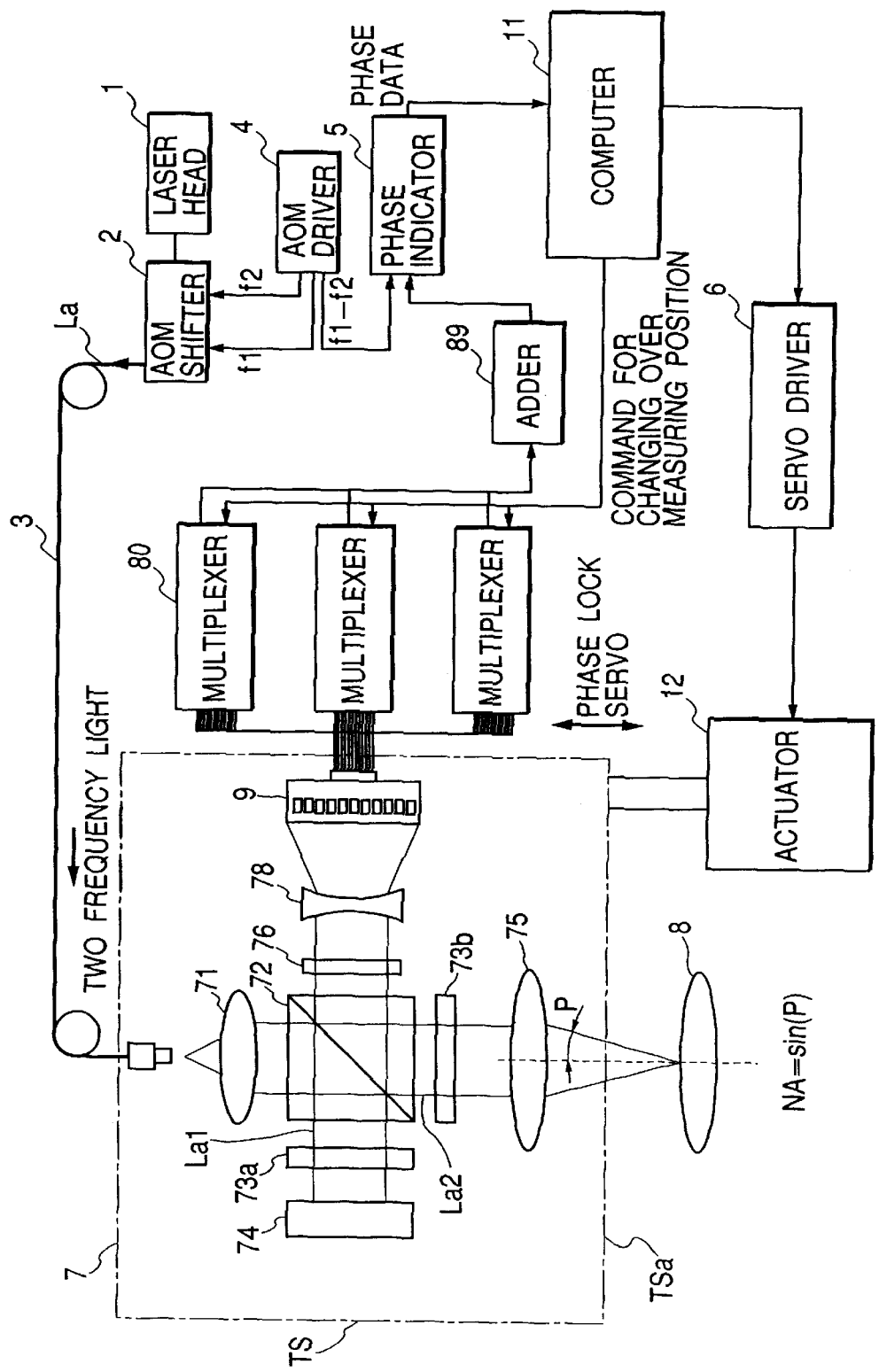
FIG. 2 is a detailed view showing an optical head portion of the first embodiment.

FIG. 1 is a schematic view showing the major parts of the first embodiment of the present invention. FIG. 2 is a view for explaining a measuring optical head (measuring head) portion shown in FIG. 1.

Referring to FIG. 1, a light source 1 is a laser. An AOM frequency shifter 2 converts a laser beam from the laser 1 into two wavelengths having different frequencies. An optical fiber 3 having a polarization preserving function guides the laser beam from the AOM frequency shifter 2 to a measuring optical head 7. The measuring optical head 7 has the arrangement shown in FIG. 2 and measures the surface shape of an object 8 to be measured by a method to be described later.

Members mounted on a base surface plate 101 are a column 102, an removing table 103, a Z-moving table 104, a work holder 105, a θ-rotating table 106, ball screws 107a and 107b, and table driving motors 108a and 108b. The removing table 103 moves in an r direction in FIG. 1. The Z-moving table 104 moves in a Z direction (optical axis direction) in FIG. 1. The θ-rotating table 106 rotates in a θ direction in FIG. 1. The ball screws 107a and 107b and the table driving motors 108a and 108b drive the removing table 103 and the Z-moving table 104 in predetermined directions.

Other elements mounted on the base surface plate 101 are a laser length measuring device head 201, laser length measuring interferometers (length measuring means) 202a, 202b, and 202c, optical fibers 203 for laser length measuring devices, and a reference plane mirror 205 for position measurement. These elements detect movement information (position information) of the r-moving table 103 and the Z-moving table 104.

In this embodiment as shown in FIG. 1, assuming that an r-θ-Z cylindrical coordinate system is present on the measuring apparatus, the measuring optical head 7 is arranged on the Z-moving table 104 which is arranged on the r-moving table 103, and the measuring optical axis of the measuring optical head 7 is parallel to the Z axis. The work 8 is placed on the work holder 105 arranged on the θ-rotating table 106.

The relative positions of the removing table 103 and the Z-moving table 104 with respect to the position measuring reference mirrors 204 and 205, respectively, are precisely measured by guiding light emitted from the laser length measuring device head 201 to, e.g., the laser length measuring interferometers 202a, 202b, and 202c through the optical fibers 203.

These moving tables 103 and 104 can be freely moved by the ball screws 107a and 107b and the table driving motors 108a, 108b, and 108c.

The θ-rotating table 106 includes a rotational angle detecting encoder 104.

The above arrangement allows the measuring optical head 7 and the work 8 to freely change their relative positional relationship in this r-θ-Z cylindrical coordinate system. This positional relationship can be precisely measured.

The arrangement and operation of the measuring optical head 7 and its peripheral portion will be described below with reference to FIG. 2.

The AOM shifter 2 converts an output laser beam from the light source 1 into light (two-frequency light) La whose components are polarized in directions perpendicular to each other and have two slightly different frequencies. This two-frequency light La is input to the optical fiber 3 having a polarization preserving function and is guided to the measuring optical head 7 through fiber lines. The two-frequency light La is output from the end portion of the optical fiber 3 while the polarizing directions of the light components are maintained.

Since the output light from the optical fiber 3 is divergent light, a collimator lens 71 collimates the light and inputs the parallel light to a polarization beam splitter 72. The polarization beam splitter 72 reflects one light component La1 of the two-frequency light to a reference plane surface 74 and transmits the other light component La2 to the work 8.

The light component La1 propagating to the reference plane surface 74 is converted into circularly polarized light by a λ/4 plate 73a and regularly reflected by the reference plane surface 74. The light component La1 is converted into linearly polarized light by passing again through the λ/4 plate 73a and returned to the polarization beam splitter 72. Since the polarizing direction is rotated 90°, the light component La1 is transmitted through the polarization beam splitter 72 to a photodetector 9.

The light component La2 propagating to the work 8 is similarly converted into circularly polarized light by the λ/4 plate 73b. This light is converged and focused on the surface of the work 8 by the objective lens 75. The light is reflected by so-called cat's eye reflection and returned through the objective lens 75 and the λ/4 plate 73b. Consequently, the light is converted into linearly polarized light and returned to the polarization beam splitter 72. Since the polarizing direction is rotated by 90°, the light is reflected to the photodetector 9.

An objective lens 75 has a larger half-aperture angle than the largest plane inclination angle of the work. Also, light is incident on the objective lens 75 by fully utilizing this half-aperture angle.

The light components reflected by the reference plane surface 74 and the work 8 are circularly polarized by a polarizing plate 76, caused to interfere with each other by this action, and incident across a full width of the photodetector (sensor) 9 having a one-dimensional array through a diffusing lens 78. A so-called beat signal having a frequency corresponding to the difference between the two frequencies is observed from each element of the sensor 9 having the one-dimensional array. However, to control measurement in accordance with plane inclination of the work 8, signals from elements corresponding to the light beam regularly reflected by the surface 8 to be measured are rapidly switched by multiplexors 80 and extracted as if the signals were one continuous data.

A multiplexor herein mentioned means a device having a high-speed switching function which guides only addressed signals from a large number of input signals to an output line.

The phase difference between this measured beat signal (to be referred to as a measured beat signal hereinafter) and a beat signal (to be referred to as a reference beat signal hereinafter) serving as a reference is measured to obtain a change in the optical length difference between the light proceeding to the reference plane surface 74 and the light propagating to the work 8. That is, while the measuring optical head 7 is servo-controlled in the optical axis direction such that the phase is held constant, the relative position of the work 8 and the measuring optical head 7 is changed in a plane perpendicular to the optical axis. By reading the moving amount by another orthogonal coordinate measuring system, the three-dimensional surface shape of the work 8 is measured in principle. For example, information of the distance from a surface TSa of a housing TS containing the individual elements to the surface of the work 8 is obtained.

In this embodiment, the reference beat signal is generated by obtaining the difference (f1−f2) between the two drive frequencies from an AOM driver 4 through a mixer circuit. This reference beat signal is input to a phase indicator 5. As described in "Related Background Art", it is also possible to obtain a reference beat signal by causing light components to interfere with each other immediately before the light components enter an interferometer.

As shown in the arrangement of FIG. 1, the relative position between the work 8 and the measuring optical head 7 (the surface TSa of the housing TS) can be freely moved and measured in the cylindrical coordinate system on the apparatus. For example, the θ-moving stage 106 is rotated while the Z-moving stage 104 is servo-controlled by a signal from the measuring optical head 7. At the same time, the removing stage 108 moves the work 8 in the radial direction r to concentrically or spirally scan the surface of the work 8. A three-dimensional shape is measured by reading the positions of these moving stages.

In conventional three-dimensional shape measuring apparatuses, if a small dust particle or flaw is present on the surface of the work 8, the spot diameter of light depends upon a wavelength NA when the objective lens 75 is completely focused. If the spot diameter is a few μm, i.e., on the same level as a dust particle or flaw, a signal from the surface of the work 8 is lost, and this causes data omission.

In this embodiment, therefore, the distance between the work 8 and the measuring optical head 7 is slightly moved to intentionally cause so-called defocusing, thereby increasing the spot diameter of light.

Letting the half-aperture angle of the objective lens 75 be P, a spot diameter u is represented by $$\phi u = 2f \cdot \tan P$$

when a defocusing amount d is given in the optical axis direction. If this is the case, as shown in FIGS. 3A and 3B, the reflected light wave surface is curved to produce W (=number) concentric interference fringes.

$$W = \frac{2d(1 - \cos P)}{\lambda} \quad \text{[Equation 1]}$$

For example, when the objective lens 75 having a half-aperture angle of 30° is used and the wavelength of light is λ=633, the spot diameter is 115 μm if defocusing=0.1 mm is given. The resultant wave surface curve produces about 42 numbers of interference fringes. Since a wave surface change caused by defocusing can be nearly approximated to a quadratic expression, a wave surface change or the number of fringes in a 10% portion in the center of the concentric circles is about 0.4. That is, a wave surface change or the number of fringes in a 11-μm portion in the center of the spot is as small as 0.4. Accordingly, even addition of a signal from a corresponding array sensor 9 does not greatly lower the intensity of the beat signal.

In this embodiment as described above, the size of a flaw and the defocusing amount have a predetermined relationship. For example, assuming that signal omission is avoided by extracting signals from an area twice or larger the size of a possible dust particle or flaw, it is only necessary to extract signals from an area about 5 μm in diameter for a dust particle or flaw about 1 to 2 μm in size. If defocusing=0.05 mm is given, the spot diameter is 58 μm, and a wave surface change or the number of fringes is 0.2 in a portion 5 μm in diameter which is approximately 10% of the spot diameter. Consequently, a satisfactory beat signal is obtained.

Accordingly, it is only necessary to intentionally give defocusing of 0.05 mm in the initial measuring position and perform servo control so as to hold the corresponding phase.

Figure 4:
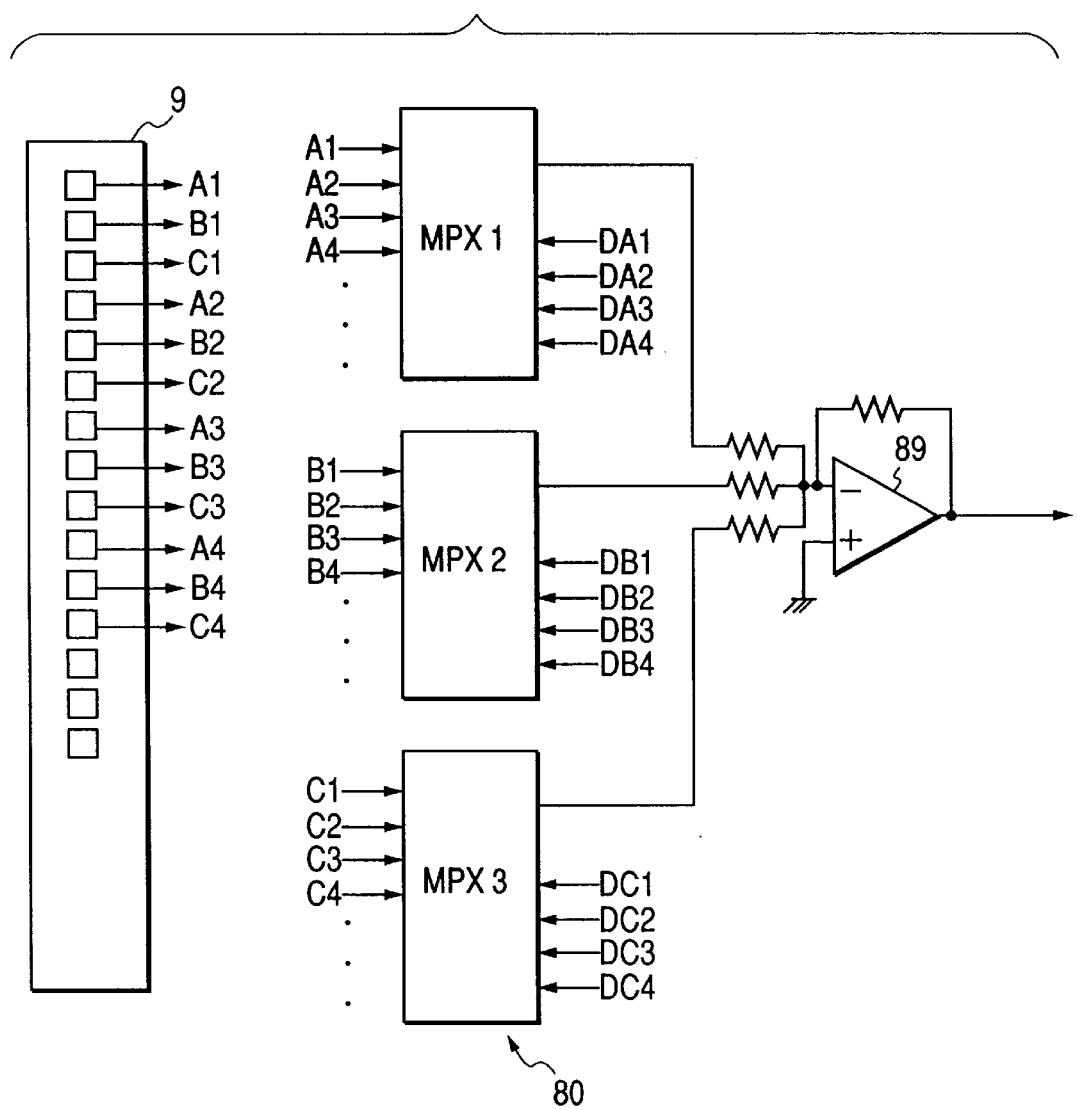
FIG. 4 is a view for explaining a signal processing system of the first embodiment.

Connections from the array sensor are as follows. For example, as shown in FIG. 4, output signals from the array sensor (photodetector) 9 including 48 numbers of elements are connected to input channels of the three 16-ch multiplexors 80 (MPXs 1 to 3) in the order of 1, 2, 3, 1, 2, 3, . . . , from one end. Output lines are connected to an analog adder 89. Output signals from these multiplexors can be freely chosen by address signals (DA1 to DA4, DB1 to DB4, and DC1 to DC4). Therefore, an addition signal of outputs from three arbitrary continuous elements in the array sensor 9 can be obtained by a command from a computer (not shown).

To increase the number of elements to be added, it is obviously only necessary to increase the number of the multiplexors 80.

If the number of elements in the array sensor 9 is large, the multiplexors 80 each having a large number of input channels are used. Alternatively, the multiplexors 80 are connected in the form of multiple stages such that outputs selected in the first stage are further selected in the second stage.

In this embodiment as described above, the array sensor 9 and the multiplexors 80 are connected to output an addition signal of outputs from continuous elements. This arrangement has the advantage that no measured signal is lost when central elements are switched in accordance with the inclination of a smoothly continuous surface to be measured. For example, assume that outputs from three continuous elements are added in the arrangement shown in FIG. 4. If the fifth element is an element corresponding to plane inclination in a certain measuring position, the outputs from elements before and after this fifth element are signals to be added. Therefore, the outputs from the fourth, fifth, and sixth elements are added and output. If the sixth element is an element corresponding to plane inclination in the next measuring position, the elements 5, 6, and 7 are used. If this is the case, it is only necessary to switch the fourth signal to the seventh signal. The fifth and sixth signals are kept output even during this switching.

In this embodiment as above, one element 5 of a plurality of elements 5, 6, and 7 is the same as one element 5 of a plurality of elements 4, 5, and 6 previously used. Consequently, if a surface to be measured is a smoothly continuous surface, elements corresponding to the plane inclination should also smoothly change. This allows this switching in the whole measuring region.

Since this measurement is phase measurement, the influence on a change in phase is small even if the amplitude of a beat signal instantaneously changes.

Second Embodiment

Figure 5:
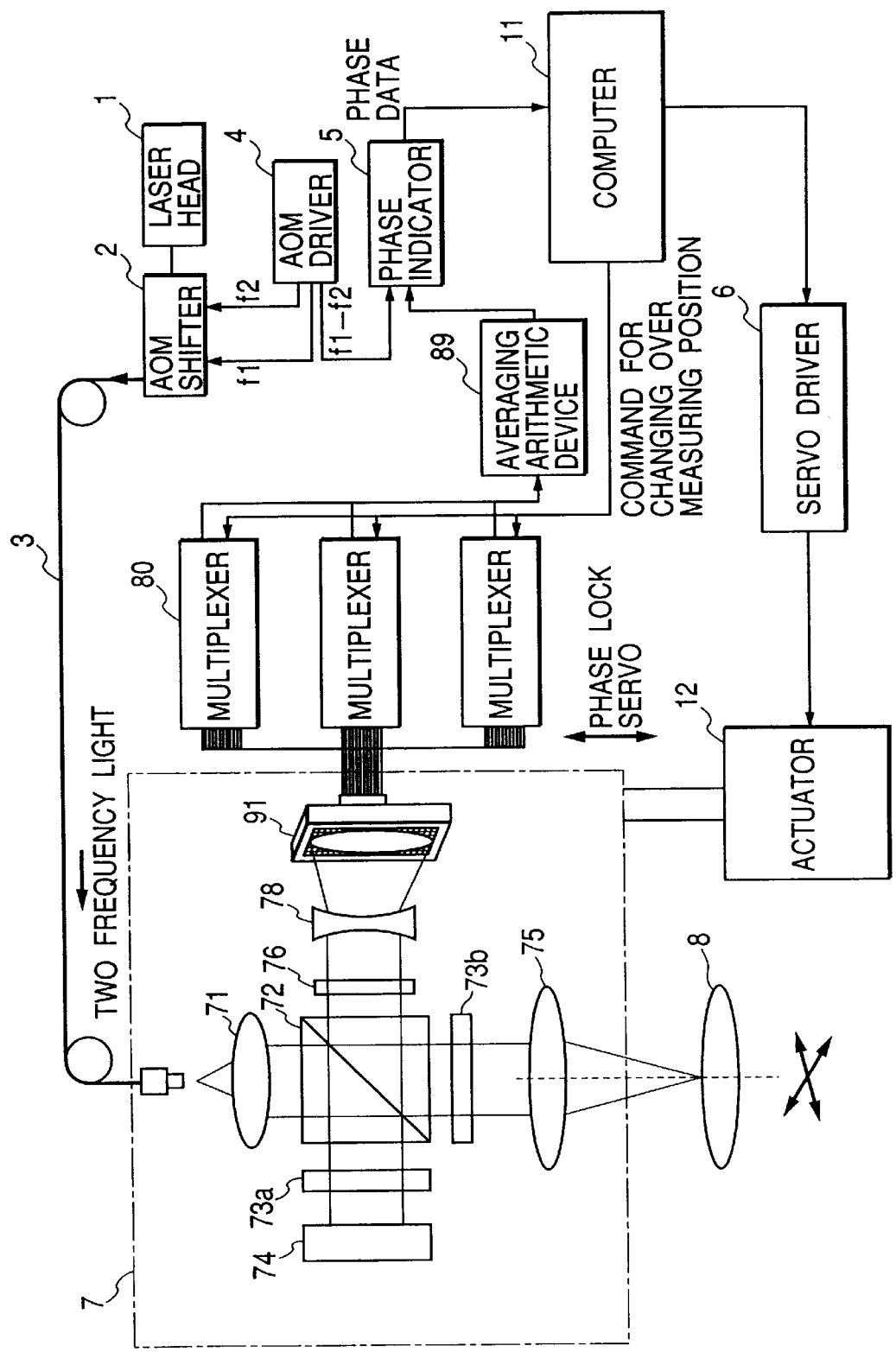
FIG. 5 is a detailed view showing an optical head portion of the second embodiment.

FIG. 5 is a view for explaining a measuring optical head and its peripheral portion of the second embodiment of the present invention.

This embodiment is the same as the first embodiment shown in FIG. 1 except that a measuring coordinate system is changed to an orthogonal coordinate system and elements corresponding to plane inclination are two-dimensionally arranged, i.e., a means for detecting a measured beat signal is changed from the one-dimensional array sensor 9 to a two-dimensional area sensor 91.

With this arrangement, even an arbitrary shape which is not axially symmetrical can be well measured.

As in the first embodiment, to avoid the influence of a dust particle or flaw on a work 8, the distance between a measuring optical head 7 and the work 8 is slightly shifted from a cat's eye position to increase the spot diameter on the work 8. At the same time, signals from an element corresponding to plane inclination and its neighboring elements in the two-dimensional area sensor 91 as a measured signal sensor are added.

Figure 6:
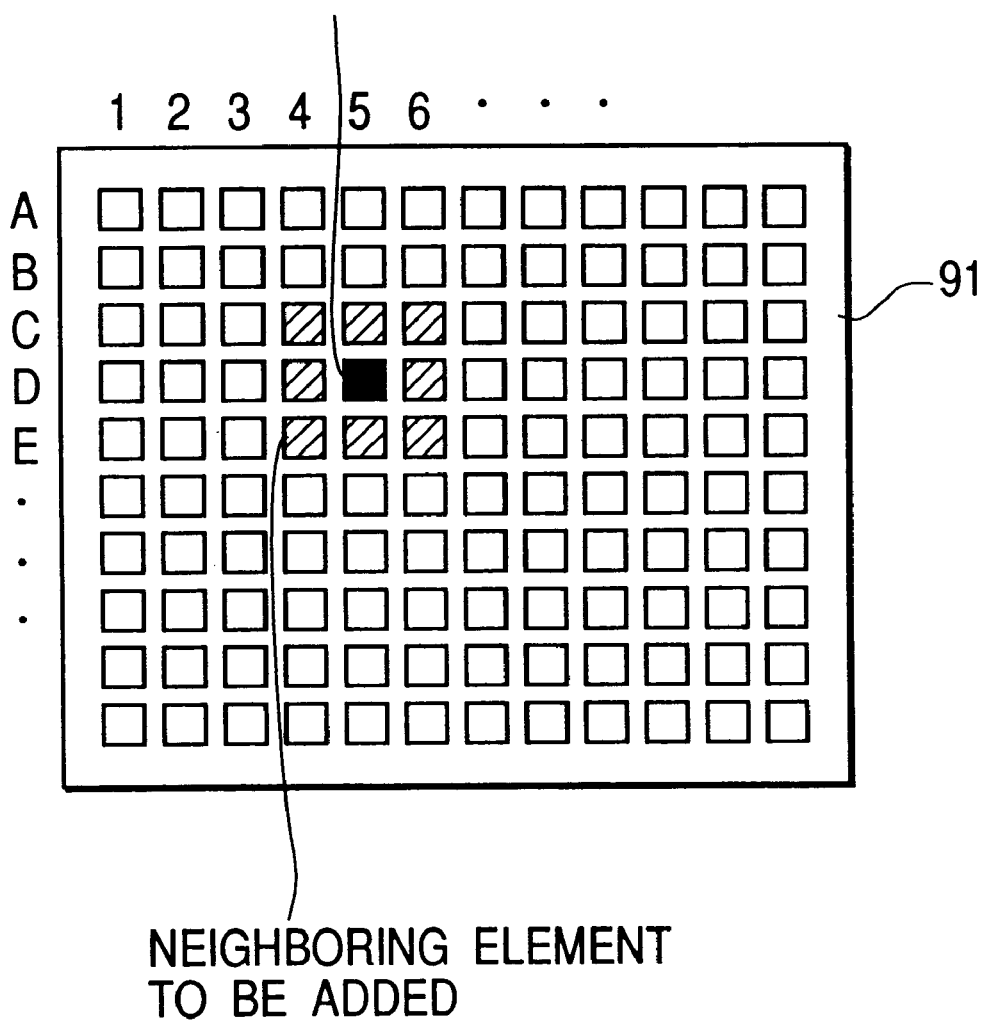
FIG. 6 is a view for explaining a signal processing system of the second embodiment.
Figure 7:
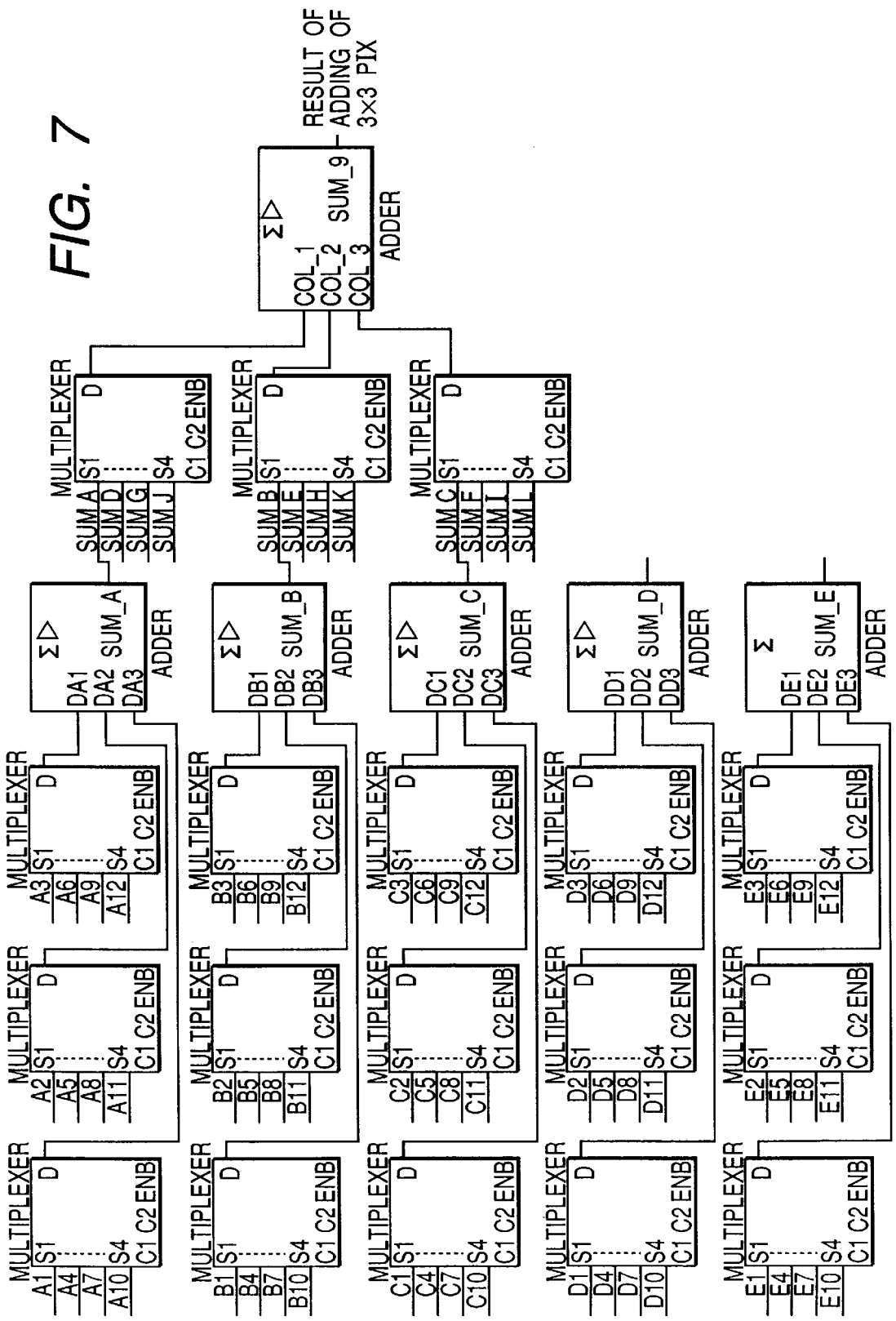
FIG. 7 is a view for explaining the signal processing system of the second embodiment.

When outputs from nine elements centering around a corresponding element of the area sensor as shown in FIG. 6 are to be added, multiplexors in the subsequent stages can be connected as shown in FIG. 7.

That is, when the row numbers and column numbers of the area sensor 91 are A, B, C, . . . , and 1, 2, 3, . . . , respectively, sensor outputs from the row A are connected to the input terminals of three multiplexors in increasing order of column numbers. Outputs from these three multiplexors are connected to the input terminals of a 3-channel adder. With this connection, a result of adding the outputs from three continuous elements is obtained for one row.

The rows B and C are similarly connected. Outputs from adders of the rows A, B, and C are connected to the inputs of three subsequent multiplexors in increasing order of row numbers, and outputs from these three subsequent multiplexors are connected to the input terminals of a subsequent 3-channel adder. With this connection, results of adding the outputs from three continuous rows can be further added.

Accordingly, by properly addressing these multiplexors, it is possible to obtain a result of adding the outputs from the nine elements, i.e., an element corresponding to plane inclination and its neighboring elements.

It is of course possible to add outputs from 4×4=16 elements or more in a similar way.

In the area sensor 91, as in the array sensor 9, it is unnecessary to switch all elements to be added when the central elements corresponding to plane inclination are switched. Consequently, signals are not interrupted upon switching.

Since the amount of received light is naturally increased by adding a large number of element signals, the signal intensity can be expected to increase. It is also possible to achieve an interference measuring apparatus capable of always appropriately obtaining an interference signal in accordance with an interference state.

By setting the individual elements as described above, it is possible to accomplish a surface shape measuring apparatus capable of always measuring a surface shape with high accuracy because a beat signal to be measured is not interrupted even if a small dust particle or flaw is present on a surface to be measured. It is also possible to achieve an interference measuring apparatus capable of always appropriately obtaining an interference signal in accordance with an interference state.

In addition, the first and second embodiments have the following arrangement.

(A1) Two light components (heterodyne light components) having slightly different frequencies are guided to a measuring optical head.

(A2) One of the heterodyne light components is regularly reflected by a reference surface. The other heterodyne light component is focused on a surface to be measured by using a lens having a numerical aperture (NA) equal to or larger than the largest plane inclination angle of an object to be measured. The two light components returned by cat's eye reflection are caused to interfere with each other and input to a one-dimensional or two-dimensional array photodetector capable of detecting a beat signal.

(A3) At this time, the distance between the measuring optical head and the object is so adjusted as to slightly defocus the light beam on the surface to be measured, thereby obtaining information from a large area.

(A4) The above beat signal is obtained by adding beat signals from neighboring pixels centering around a photodetector pixel corresponding to a light beam vertically reflected by the surface to be measured and returned. The photodetector pixels corresponding to the vertically reflected light beam are rapidly switched in accordance with a change in the measuring position.

(A5) The distance between the measuring optical head and the object are controlled in the optical axis direction such that the phase difference between a reference signal and a measured signal is held constant.

(A6) A relative position of the measuring optical head and the object can be changed in an orthogonal coordinate system by a moving mechanism provided for the head or the object. One axis (e.g., the Z axis) of the orthogonal coordinate system is matched with the measuring optical axis of a heterodyne interferometer. The existing range of the object is scanned in X and Y directions, and the X, Y, and Z positions of the moving object are accurately read by separately provided length measuring devices. In this manner, the three-dimensional shape of the object is measured.

With the above arrangement, the first and second embodiments achieve the following effects.

(B1) Even if a small dust particle or flaw is present on a surface to be measured, a beat signal to be measured is not completely interrupted. This allows stable measurements.

(B2) Since results of adding outputs from continuous elements are used, it is unnecessary to switch all elements subjected to addition upon switching of elements. This eliminates signal interruption upon element switching.

(B3) Adding of a large number of element signals increases the amount of received light and the signal intensity.

Third Embodiment

Figure 8:
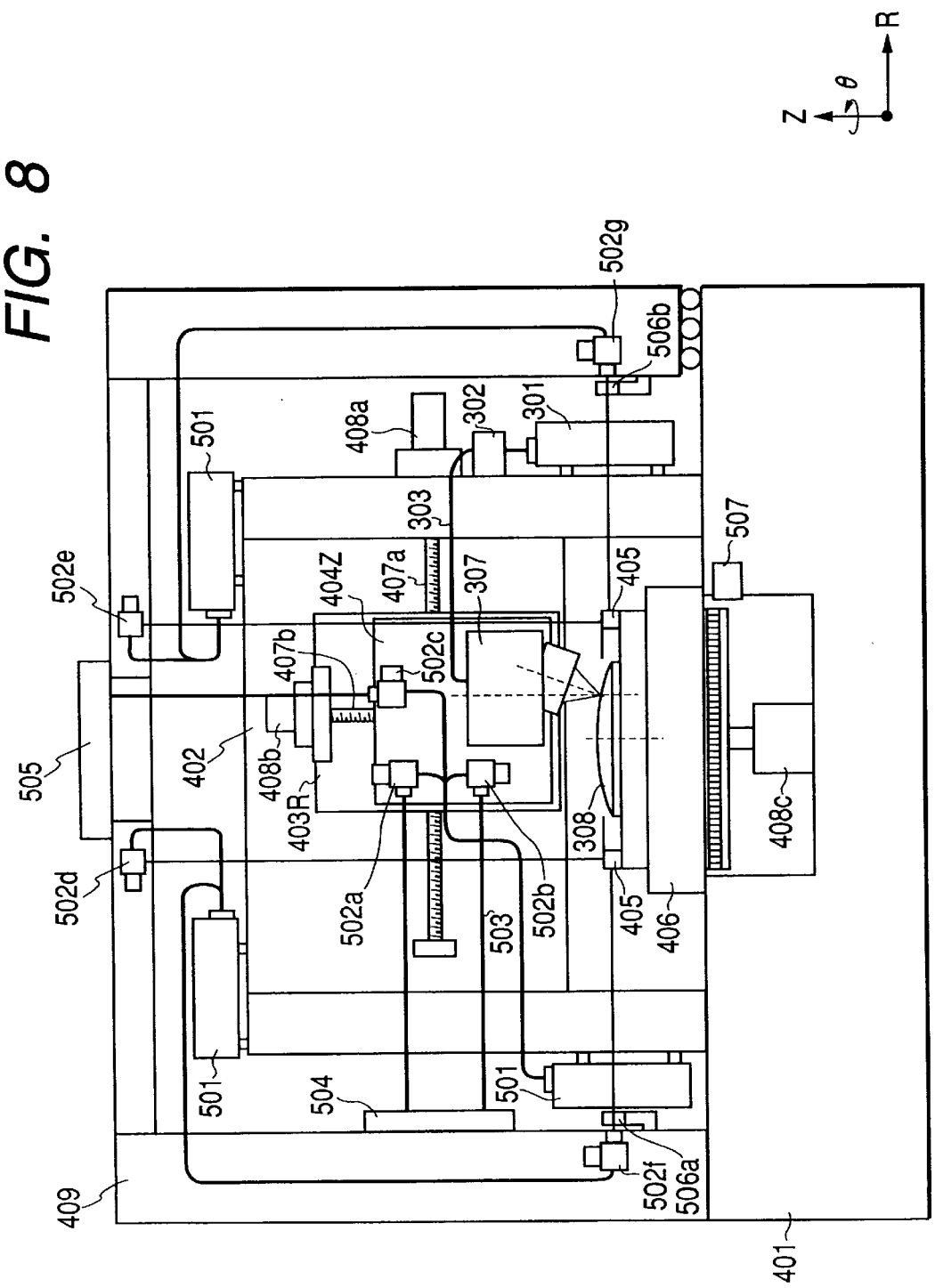
FIG. 8 is a schematic view showing the main parts of the third embodiment.
Figure 9:
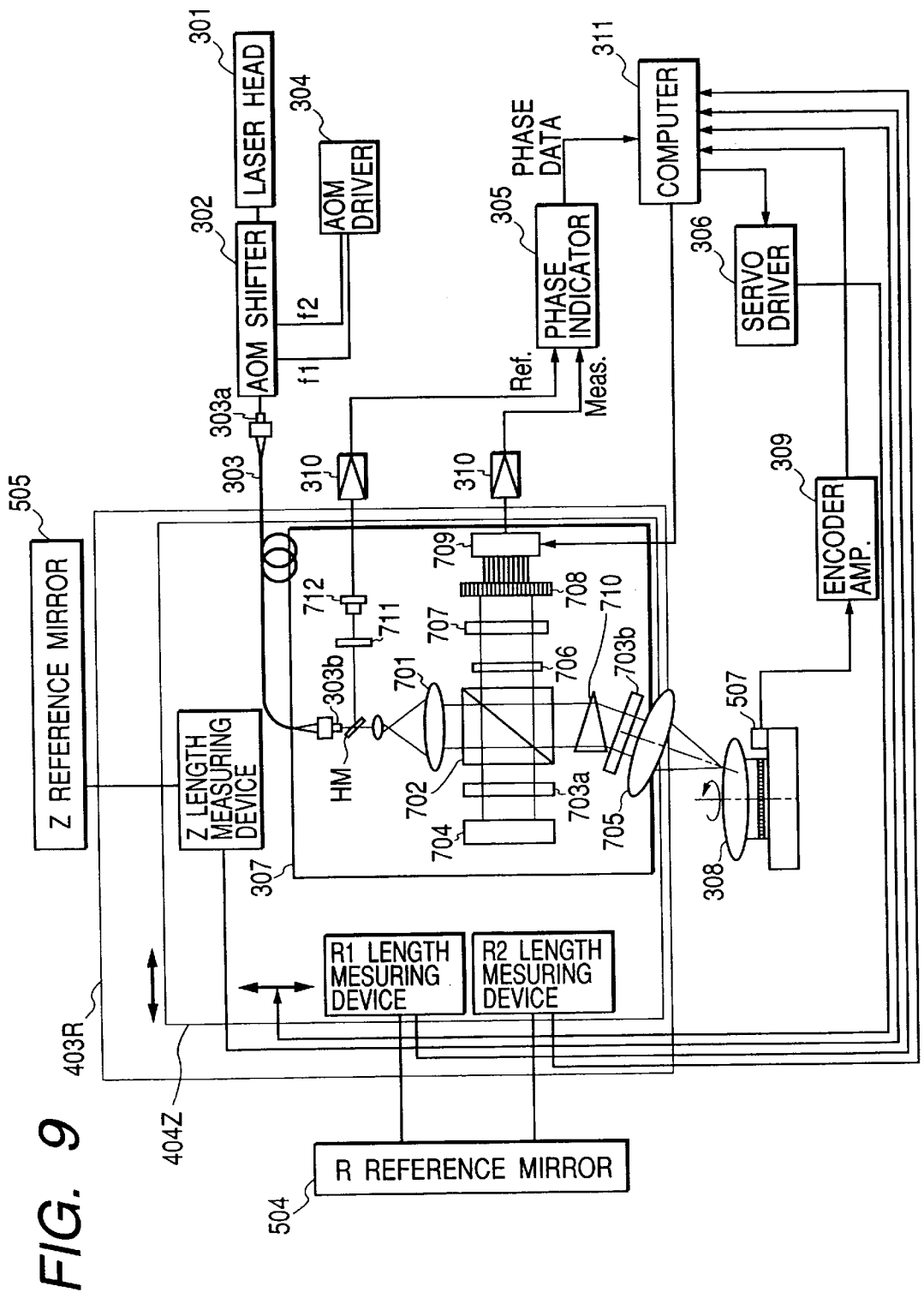
FIG. 9 is a detailed view showing an optical head portion of the third embodiment.

FIG. 8 is a schematic view showing the major components of the third embodiment of the present invention. FIG. 9 is a schematic view showing the major parts of a measuring optical head (optical head) and its peripheral portion shown in FIG. 8. FIGS. 10A and 10B are enlarged views of a part of FIG. 9. First, the mechanical arrangement of the whole apparatus of the present invention will be described below with reference to FIG. 8.

Referring to FIG. 8, the apparatus includes a laser light source 301, an AOM frequency shifter 302, a polarized wave surface storing optical fiber 303, and a measuring optical head 307 having the arrangement shown in FIG. 9. The apparatus also includes a work (object) 308 to be measured, a base surface plate 401, a column 402, an R-moving stage 403, a Z-moving stage (Z stage) 404, a ring mirror 405, a θ-rotating stage (θ-moving stage) 406, ball screws 407a and 407b, R- and Z-stage driving motors 408a and 408b, a θ-rotating stage driving motor 408c, a measurement reference frame 409, laser length measuring device heads 501, interferometers 502a to 502g for laser length measurements, optical fibers 503 for laser length measuring devices, reference plane mirrors 504 and 505 for position measurements, cylindrical condenser lenses 506a and 506b, and an encoder 507 for θ rotational position measurement.

Assuming an R-θ-Z cylindrical coordinate system is present on the measuring apparatus, the measuring optical head 307 is arranged on the Z-moving stage 404 which is arranged on the R-moving stage 403. The measuring optical axis matches the Z axis. The work 308 and the ring mirror 405 are placed on the θ-rotating stage 406.

The relative positions of the R-moving stage 403 and the Z-moving stage 404 with respect to the R reference mirror 504 and the Z reference mirror 505, respectively, are precisely measured by guiding light emitted from the laser length measuring device heads 501 to the interferometers 502a, 502c, and 502b as laser length measuring devices and the like.

The reference mirrors 504 and 505 for position measurements are placed on the measurement reference frame 409. This measurement reference frame 409 has the shape of a gate having low thermal expansion and sufficient rigidity. One end of the gate is fixed to the base surface plate 401. The other end of the gate is so attached as to be free in the horizontal direction and restricted in the vertical direction. Therefore, even if the main body is deformed by load movement of a moving stage or by thermal expansion, the measurement reference frame 409 is not influenced by this deformation.

The upper surface of the ring mirror 405 placed on the θ-rotating stage 406 is monitored by the laser length measuring devices 502d and 502e. The outer circumferential surface of the ring mirror 405 is monitored by the laser length measuring devices 502f and 502g.

The outer circumferential surface of the ring mirror 405 is a cylindrical surface. Therefore, laser beams are condensed by the cylindrical condenser lenses 506a and 506b and incident on the outer circumference of the ring mirror 405.

These measuring light components are arranged in a plane including the θ-rotating stage axis and an R-moving stage axis so as to decrease errors caused by attitude errors of these moving stages. For the same reason, length measuring device light for Z axis measurement is so arranged as to match the optical axis of an optical probe head. Also, these moving stages can be freely moved by the ball screws 407a and 407b and the stage driving motors 408a and 408b.

In this arrangement, a rotational angle θ, a position in a radial direction R, and a position in a Z direction of the surface of the work 308 in the cylindrical coordinate system are basically measured by the encoder (rotary encoder) 507, the interferometer 502a, and the interferometer 502c, respectively. Supplementarily, the interferometers 502d and 502e correct a thrust error of the θ-rotating stage 406, and the interferometers 502f and 502g correct a radial error of the θ-rotating stage 406. All of these data obtained at the same time can be output by latching the data by, e.g., a reception timing of the encoder 507.

In this arrangement, therefore, the relative positional relationship between the measuring optical head 307 and the work 308 can be freely changed in the R-θ-Z cylindrical coordinate system. Additionally, this positional relationship can be precisely measured regardless of the accuracy of the moving stages.

The arrangement and operation of the measuring optical head 307 and its peripheral portion will be described below with reference to FIGS. 9, 10A, and 10B.

Referring to FIG. 9, a laser head 301 is a light source. An AOM frequency shifter 302 converts incident light into two-frequency light whose components have slightly different frequencies. Other elements are a polarization preserving optical fiber 303, an AOM driver 304, a phase meter 305, a servo driver 306, the measuring optical head 307, the work 308, an encoder amplifier 309, a computer 311, a beam expander 701, a polarization beam splitter 702, λ/4 plates 703a and 703b, a reference plane surface 704, an objective lens 705, a polarizing plate 706, an anamorphic optical element 707 such as a cylindrical lens, an array sensor 708, a multiplexor 709, a prism 710, a polarizing plate 711, and a reference signal sensor 712.

In FIG. 9, the AOM shifter 302 converts a laser beam emitted from the light source 301 into light components polarized in directions perpendicular to each other and having slightly different frequencies. These light components are incident from an incident surface 303a of the polarization preserving optical fiber 303 and guided to the measuring optical head 307 through fiber lines. The two-frequency light components are output from an end portion (exit portion) 303b while the polarizing directions are maintained. A portion of the exit light components from the exit portion 303b of the optical fiber 303 is extracted as a reference signal by a half mirror HM. This light is made to cause interference through the polarizing plate 711. The reference signal sensor (sensor) 712 detects the resulting beat signal.

The rest of the light transmitted through the half mirror HM is fed into the polarization beam splitter 702 while the beam diameter is increased by the beam expander 701. One of the two-frequency light components is reflected toward the reference plane surface 704 through the λ/4 plate 703a. The other light component is transmitted through the polarization beam splitter 702 to the work 8.

The light propagating to the reference plane surface 704 is converted into circularly polarized light by the λ/4 plate 703a and regularly reflected by the reference plane surface 704. The reflected light is converted into linearly polarized light by passing again through the λ/4 plate 703a and returned to the polarization beam splitter 702. Since the polarizing direction is rotated by 90°, the light is transmitted through the polarization beam splitter 702 to the photodetector 708.

The optical axis of the light propagating to the work 8 is inclined by a predetermined angle by the prism 710. As in the case of the reference side, this light is converted into circularly polarized light by the λ/4 plate 703b. This light is converged and focused on the surface of the work 8 by the objective lens 705. The light is reflected by so-called cat's eye reflection, returned through the original optical path in the order of the objective lens 705, the λ/4 plate 703b, and the prism 710. Consequently, the light is converted into linearly polarized light and returned to the polarization beam splitter 702. Since the polarizing direction is rotated by 90°, the light is reflected to the photodetector 708.

Assume that the objective lens 705 is so attached that the optical axis inclined by the prism 710 matches the lens axis, and this inclination angle is smaller than the half-aperture angle of the objective lens 705.

The light components reflected by the reference plane surface 704 and the work 8 are caused to interfere with each other by the polarizing plate 706. The resulting light beam is incident as an elliptic light beam on the array sensor 708 through the anamorphic optical element 707. The array sensor 708 detects a so-called beat signal having a frequency corresponding to the difference between the two frequencies.

The measuring light is returned to the entire surface of the array sensor 708 when the optical axis of the objective lens 705 matches the surface normal of the work 8. In other cases, the returned measuring light is shifted in the longitudinal direction of the array sensory 703.

Accordingly, as shown in FIGS. 10A and 10B, an output from the array sensor 708 is selected in accordance with the surface normal angle of a measuring position such that the plane inclination of the work 8 is within the range of the full-aperture angle of the objective lens 705. In this manner, a measured signal is obtained at all times.

The inclination angle is smaller than the half-aperture angle of the objective lens 705. Therefore, it is possible to perform measurement from a point with no inclination, i.e., an apex of the work 308 to a point with maximum inclination by using the full-aperture angle of the objective lens 705.

Since the normal angle of the work 308 is known from a designed value, the array sensor 708 to be selected as a function of the position of the head 307 is previously known. Accordingly, addressing for the multiplexors 709 is performed by a command from the computer 11 to obtain only one measured signal corresponding to the surface normal angle of the work 308.

The phase meter 305 measures the phase difference between this signal (to be referred to as a "measured beat signal" hereinafter) obtained by the array sensor 708 and a reference signal (to be referred to as a reference beat signal" hereinafter) obtained by the sensor 712. Consequently, a change in the optical path length difference between the light propagating to the reference plane surface 704 and the light propagating to the work 308 is known. Therefore, the measuring optical head 307 is servo-controlled in the optical axis direction such that the phase is held constant. At the same time, a relative position of the work 308 and the measuring optical head 307 is changed in the work radial direction, and the moving amount is read by the orthogonal coordinate meters 502a, 502b, and 502c. In this manner, the three-dimensional surface shape of the work 308 is measured in principle.

As shown in the arrangement of FIG. 8, the relative position of the work 308 and the measuring optical head 307 can be freely moved and measured in the cylindrical coordinate system on the apparatus. Therefore, while the Z-moving stage 404 is servo-controlled by a signal from the measuring optical head 307, the R-moving stage 403 is moved in the work radial direction. Simultaneously, the work 308 is rotated about its axis, and the rotational angle e is detected by the encoder 507. By reading this rotational angle e by the encoder amplifier 309, the three-dimensional shape data of the work 308 can be concentrically or spirally measured.

During the measurement, appropriate correction is performed by using measurement data from, e.g., the interferometers 502d, 502e, 502f, and 502g as an auxiliary measuring system shown in FIG. 8. Consequently, it is possible to eliminate a kinetic error of the rotating stage 406 and an error caused by thermal expansion or the like during the measurement.

Also, as data in the Z direction, a servo error based on an output from the phase meter 305 is added to Z-position information of the head 307 obtained by the interferometer 502c. Accordingly, a servo error is no longer a direct error cause, so more accurate measurement is possible.

When the objective lens 705 is inclined as shown in FIGS. 8 and 9, it is only necessary to move the work 308 from the center to the right in the radial direction if the work 308 has a convex surface. If the work 308 has a concave surface, the work 308 need be moved to the left in the radial direction.

Figure 11:
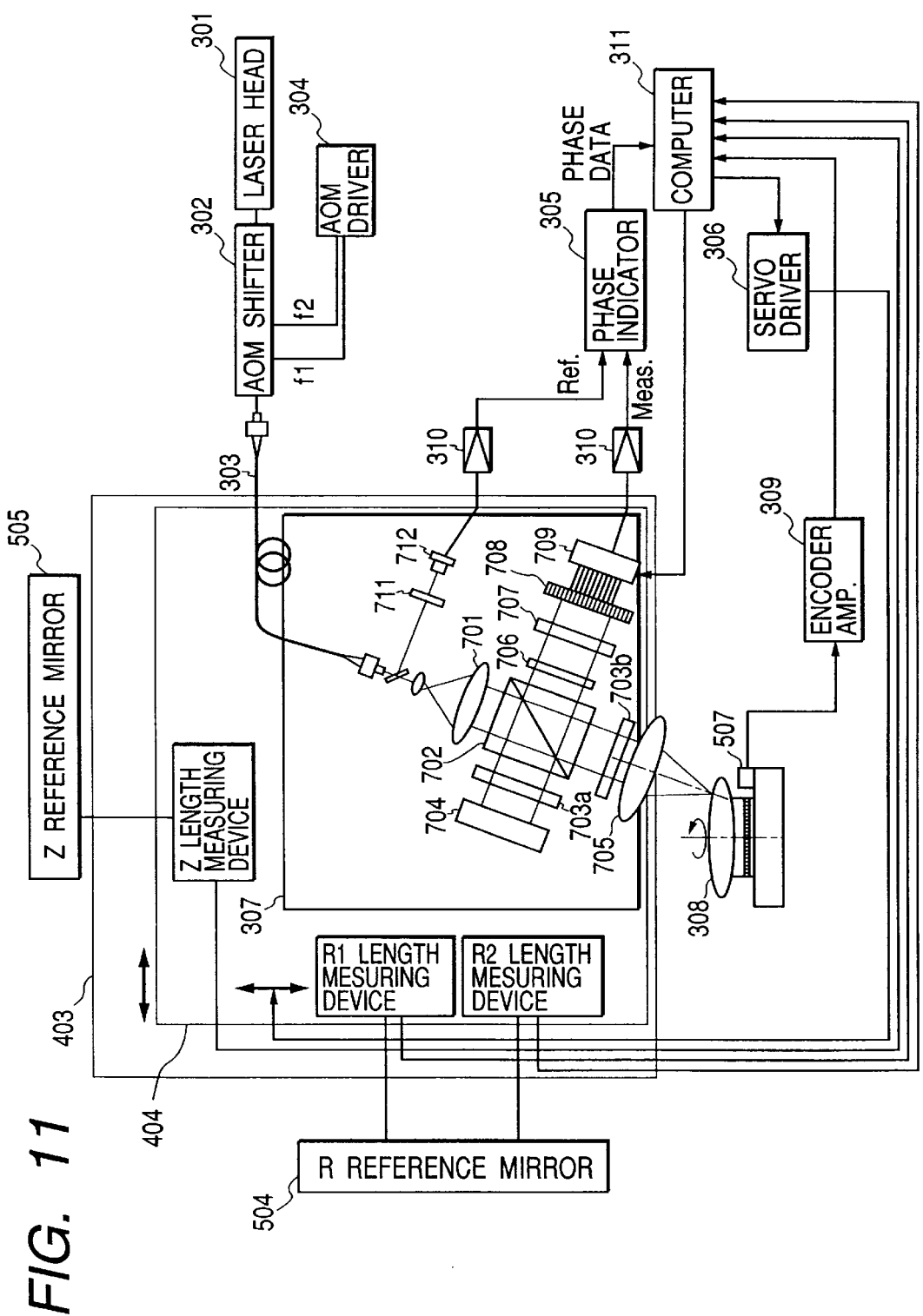
FIG. 11 is a detailed view showing an optical head portion of the fourth embodiment.
Figure 12:
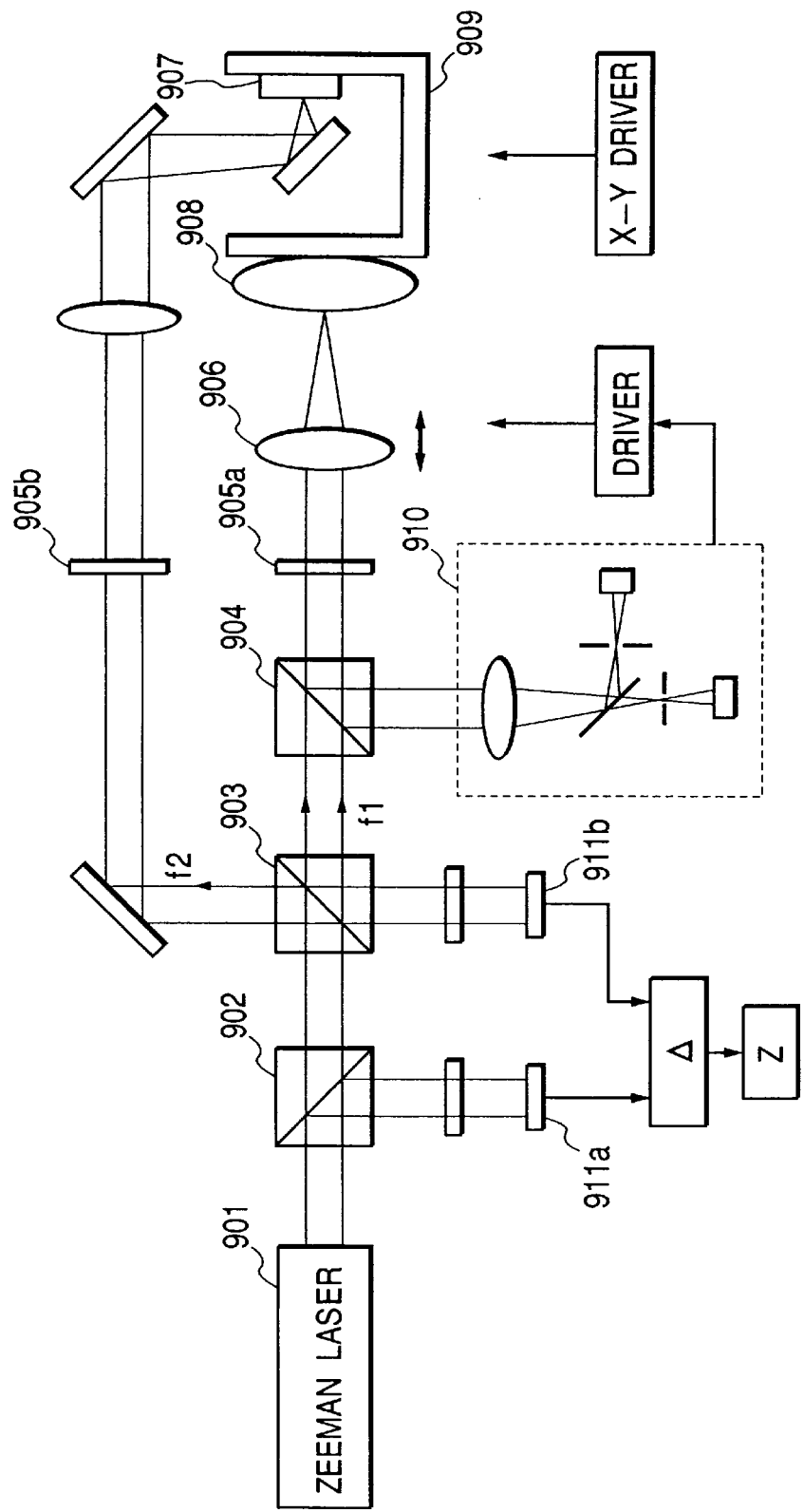
FIG. 12 is a schematic view showing the major components of a conventional surface shape measuring apparatus.
Figure 13:
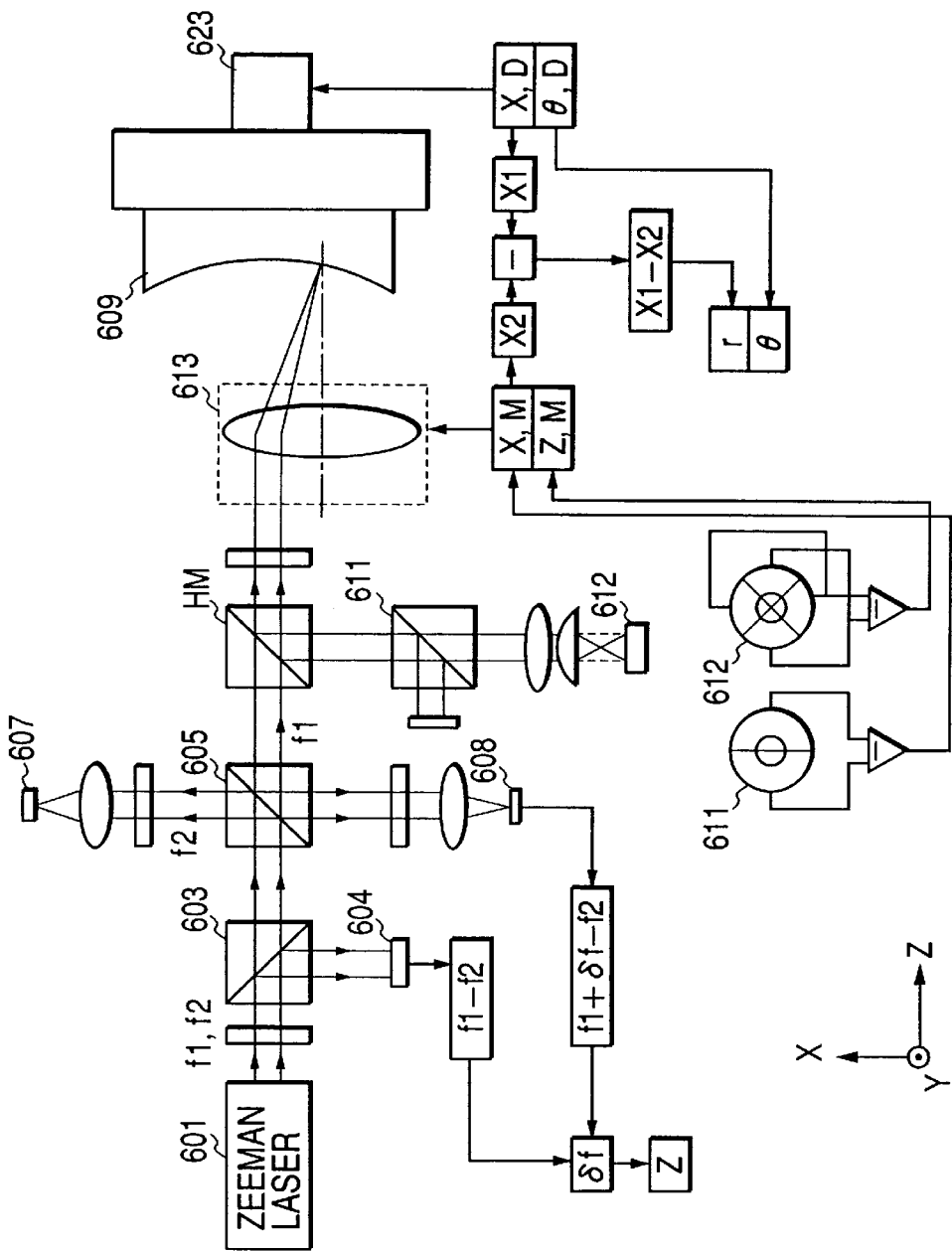
FIG. 13 is a schematic view showing the main components of another conventional surface shape measuring apparatus.
Figure 14:
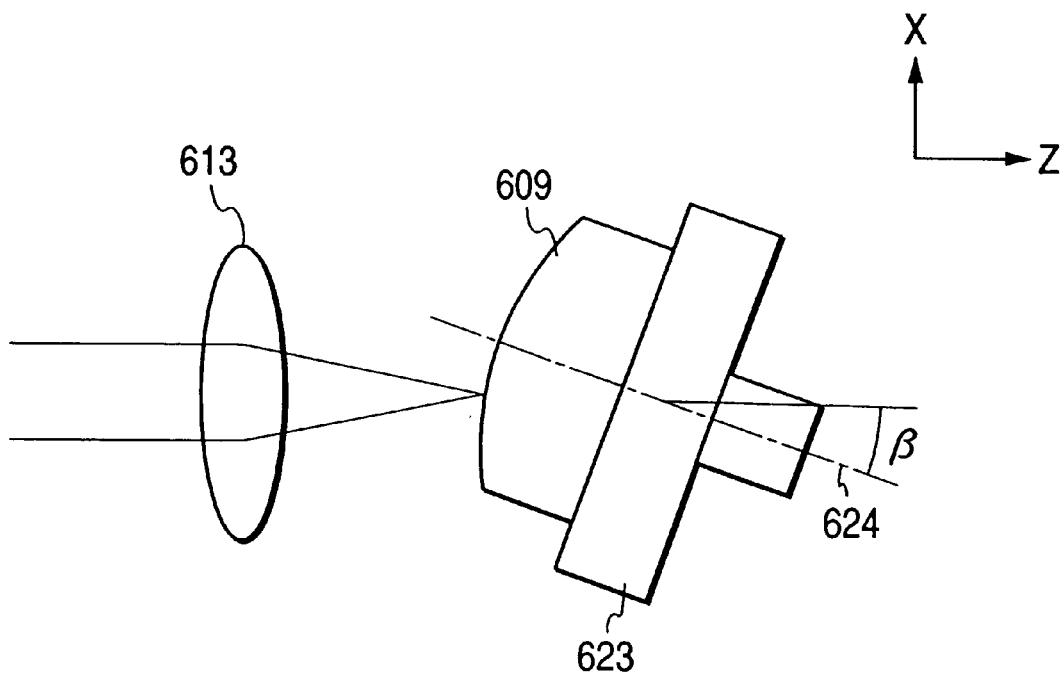
FIG. 14 is a view for explaining the main components of the surface shape measuring apparatus shown in FIG. 13.

FIG. 11 is a schematic view showing the main parts of the fourth embodiment of the present invention. The arrangement of this embodiment is basically the same as the third embodiment shown in FIG. 9 except that a head 307 is entirely inclined to the work axis of a work 308.

Even when the whole head 307 is inclined as shown in FIG. 9, the essential arrangement of the present invention is maintained; i.e., the work axis and the axis of work rotation match with each other, and the optical axis of an objective lens 705 of an optical probe is inclined to the work axis when radial scan directions are perpendicular to each other.

This arrangement has another advantage that no prism is necessary to incline the optical axis unlike in the third embodiment.

As described above, the third and fourth embodiments can achieve a three-dimensional shape measuring apparatus in which the surface of an object to be measured is optically scanned and measured by an optical probe from an optical head in a stage system having three relative movable axes, i.e., θ, R, and Z axes, and which can accurately obtain a three-dimensional shape of an object to be measured having a large inclined surface by attaching the optical probe such that the optical axis of the optical probe is inclined to the axis of rotational symmetry or the axis of rotation at a smaller angle than the half-aperture angle of its objective lens.

More specifically, to measure the shape of a rotationally symmetric work such as a lens by using an optical probe, an apparatus is so constructed as to scan and measure the work surface in an R-θ-Z cylindrical coordinate system by using rotation and displacement with respect to at least three axes, i.e., rotation of the work about the axis of rotation matching the axis of rotational symmetry of the work, relative movement of an optical probe head and the work in the work radial direction perpendicular to the axis of rotation, and relative movement of the optical probe head and the work in the work axial direction. In addition, the optical probe head is so attached that its optical axis is inclined to the axis of rotational symmetry or the axis of rotation at a smaller angle than the half-aperture angle of its objective lens. Consequently, the following effects are obtained.

(C1) Since a work can be horizontally placed, the apparatus is advantageous in measuring a large work. While support deformation of a work is minimized or made equal to that in a use state, a large inclined surface can be measured by using the full-aperture angle of the objective lens.

(C2) The space occupied by a work in the apparatus can be decreased.

(C3) In correcting kinetic errors of the moving axes on the basis of external standards, measurements for the correction are easy to perform because all these axes are perpendicular to each other.

Also, if the sum of the inclination angle of the optical axis of the optical probe and the half-aperture angle of the objective lens is larger than the largest inclination angle of an object to be measured, a whole portion of the object can be measured.

Furthermore, when defocusing is performed in this embodiment in the same manner as in the first embodiment described earlier, the influence of a dust particle or flaw on a surface to be measured can be alleviated.

What is claimed is:

1. A shape measuring apparatus comprising:

a light source for generating light beams including two different frequency components;

an optical system for extracting a reference signal from the light beams including the two frequency components, reflecting one of the light beams containing the two frequency components by a reference surface, reflecting the other light beam by a measuring region of a surface to be measured, and causing the two reflected light beams to interfere with each other;

a photodetector having a plurality of photodetecting elements to detect the interference light beam from said optical system;

a housing for holding at least a part of said optical system and said photodetector;

an actuator for changing a relative position between said housing and the surface to be measured; and a length measuring device for detecting position information of said housing, wherein an element corresponding to a light beam vertically reflected by the surface to be measured is selected from said photodetector, a measured signal is detected by adding output signals from said selected element and neighboring elements thereof, a distance between said housing and the surface to be measured is controlled in an optical axis direction such that a phase difference between the reference signal and the measured signal is held constant, and a shape of the surface to be measured is measured from position information of said housing when the relative position of said housing and the surface to be measured is changed in a direction perpendicular to the optical axis.

2. An apparatus according to claim 1, wherein when the measured signal is obtained from said photodetector, said photodetector switches photodetector elements to be selected in accordance with a change in plane inclination caused by movement of a measuring position in the surface to be measured, and some of a plurality of elements to be added after said elements are switched are the same as some of a plurality of elements used before the switching.

3. An apparatus according to claim 1, wherein the measured signal is obtained from said photodetector by combining a plurality of multiplexors and an analog adder.

4. An apparatus according to claim 1, wherein said optical system comprises a lens system having a half-aperture angle not smaller than a largest plane inclination angle of the surface to be measured.

5. An apparatus according to claim 1, wherein said optical system causes the light beam to be incident on the surface to be measured such that the light beam is defocused.

6. An apparatus according to claim 1, wherein the measuring region concentrically or spirally scans the surface to be measured to measure a three-dimensional shape of the surface.

7. An apparatus according to claim 5, wherein said optical system moves in the direction perpendicular to the optical axis, and the surface to be measured is rotated about an axis parallel to the optical axis.

8. A shape measuring apparatus comprising:

a light source for generating light beams including two different frequency components;

an interference optical system for reflecting one of the light beams including the two frequency components by a reference surface, reflecting the other light beam by a measuring region of a surface to be measured, and causing the two reflected light beams to interfere with each other; and a photodetector having a plurality of photodetecting elements to detect the interference light beam from said optical system, wherein said photodetector measures a shape of the surface to be measured by using a periodic signal obtained by adding detection signals from a plurality of photodetecting elements, selected from said photodetecting elements, in positions substantially corresponding to an interference light beam of a light beam vertically reflected by the measuring region.

9. An apparatus according to claim 8, wherein the shape of the surface to be measured is measured by comparing the periodic signal with the reference signal while the measuring region of the surface is sequentially changed, displacing said interference optical system and the surface relative to each other such that a phase difference between the periodic signal and the reference signal is held constant, and measuring the relative displacement.

10. An apparatus according to claim 8, wherein a three-dimensional shape of the surface to be measured is measured by moving said interference optical system in a translation direction, moving the surface in a rotating direction with respect to the incident light beam from said interference optical system, and displacing said interference optical system and the surface relative to each other.

11. An interference measuring apparatus comprising:

an interference optical system for causing two light beams to interfere with each other; and a photodetector having a plurality of photodetecting elements to receive the interference light beam from said interference optical system, wherein an interference signal is obtained by adding detection signals from a plurality of photodetecting elements, selected from said photodetecting elements, in positions substantially corresponding to a specific interference light beam.

12. An apparatus according to claim 11, wherein a plurality of photodetecting elements in positions substantially corresponding to a specific interference light beam are selected from said photodetecting elements, and detection signals from said selected photodetecting elements are added.

13. A shape measuring method comprising the steps of:

obtaining a reference signal from two light components having different frequencies;

reflecting one of the two light components by a reference surface;

reflecting the other light component by a measuring region on a surface to be measured to obtain reflected light from the surface;

causing the two reflected light components to interfere with each other;

selecting an element corresponding to a light beam vertically reflected by the surface to be measured from a photodetector and obtaining a measured signal by adding output signals from neighboring elements centering around said selected element;

controlling a distance between a housing holding a lens system and said photodetector and the surface to be measured in an optical axis direction of said lens system such that a phase difference between the reference signal and the measured signal is held constant; and measuring a shape of the surface to be measured by changing a relative position of said housing and the surface in a direction perpendicular to the optical axis of said lens system and reading position information of said housing by length measuring means.

14. A shape measuring apparatus comprising:

an optical head for irradiating, with light from an optical probe, an object to be measured having a rotationally symmetric shape, and receiving reflected light from the object;

a θ-rotating stage mounting the object and capable of rotating about an axis nearly matching with an axis of rotational symmetry of the object;

an R-moving stage for moving said optical head and the object relative to each other in a radial direction perpendicular to the axis of rotational symmetry of the rotationally symmetric object; and a Z-moving stage for moving said optical head and the object relative to each other in a direction of the axis of rotational symmetry, wherein an optical axis of said optical probe is inclined to the axis of rotational symmetry at a smaller angle than a half-aperture angle of an objective lens in said optical head.

15. An apparatus according to claim 14, wherein an optical axis of said objective lens in said optical head is inclined to an axis of said Z-moving stage.

16. An apparatus according to claim 14, wherein a sum of the inclination angle of the optical axis of said optical probe with respect to the axis of rotational symmetry and the half-aperture angle is larger than a largest plane inclination angle of the object.

17. A shape measuring apparatus comprising:

an optical head for irradiating, with light from an optical probe, an object to be measured having a rotationally symmetric shape, and receiving reflected light from the object;

a θ-rotating stage for rotating the object relative to said optical head;

an R-moving stage for moving said optical head and the object relative to each other in a radial direction of the relative rotation of said θ-rotating stage; and a Z-moving stage for moving said optical head and the object relative to each other in a direction of the axis of relative rotation of said θ-rotating stage, wherein said optical probe from said optical head scans a surface of the object, and an optical axis of said optical probe is inclined to the axis of relative rotation at a smaller angle than a half-aperture angle of an objective lens in said optical head.

18. A shape measuring apparatus comprising:

an optical head for irradiating an object to be measured with light and detecting reflected light from the object to obtain shape information of the object; and a stage device for rotating said optical head and the object relative to each other and displacing said optical head and the object relative to each other in a radial direction and an axial direction, respectively, of the relative rotation, wherein said optical head optically scans the object by the relative rotation and the relative movement by said stage device, and an optical axis of at least an objective portion of said optical head is inclined to the axis of rotation at a smaller angle than a half-aperture angle of an objective lens in said optical head.

* * * * *

UNITED STATES PATENT AND TRADEMARK OFFICE
CERTIFICATE OF CORRECTION

PATENT NO. : 6,008,901 Page 1 of 1
DATED : December 28, 1999
INVENTOR(S) : Masaru Ohtsuka It is certified that error appears in the above-identified patent and that said Letters Patent is hereby corrected as shown below:

<u>Title page, Item [54] and Column 1, line 3,</u>
"AARAY" should read -- ARRAY --.

<u>Column 4,</u>
Line 48, "removing" should read -- r-moving --.
Line 51, "removing" should read -- r-moving --.

<u>Column 6,</u>
Line 11, "multiplexors" should read -- multiplexers --.
Line 13, "multiplexor" should read -- multiplexer --.
Line 48, "removing" should read -- r-moving --.

<u>Column 12,</u>
Line 57, "reference" should read -- "reference --.

<u>Column 15,</u>
Line 5, "multiplexors" should read -- multiplexers --.

Signed and Sealed this

Twenty-fourth Day of December, 2002

JAMES E. ROGAN
*Director of the United States Patent and Trademark Office*